Jan. 1, 1957  S. J. HEINRICHS  2,776,045
BAR CONVEYOR
Filed Feb. 27, 1956

DIRECTION OF CONVEYOR ADVANCE
DIRECTION OF SPROCKET ROTATION

INVENTOR.
SAMUEL J. HEINRICHS
BY
Christie, Parker & Hale
ATTORNEYS 2,776,045
BAR CONVEYOR Samuel J. Heinrichs, Bakersfield, Calif., assignor to Field Maintenance Service, Bakersfield, Calif., a partnership Application February 27, 1956, Serial No. 568,040

6 Claims. (Cl. 198—195)

This invention is concerned with bar conveyors, particularly those of the endless type, in which a series of bars spaced side by side are mounted on and extend between concentric rotatable toothed sprockets spaced from each other along their axis of rotation. The invention provides simple and rugged means for adjusting the spacing between the bars and finds application in a variety of equipment, such as movable grizzlies and vegetable digging machines, in which the bar conveyors are employed as screens.

In ore dressing grizzlies, mechanical potato diggers and the like it is frequently desirable to change the spacing between the cross bars of a conveyor and a number of arrangements have been proposed for this purpose. Most of them, however, are relatively complicated and for this reason have not found extensive use.

I have developed improvements in bar conveyors in which the spacing between cross bars can be altered over a wide range of multiples. The structure of my invention is simple and permits the manufacture of inexpensive rugged bar conveyors which may be assembled to give a variety of spacings. Essentially, the loop conveyor of my invention comprises a plurality of long bars extending between sets of toothed concentric rotatable sprockets spaced from each other along their axis of rotation, with each bar adapted to rest at its ends between the teeth of a sprocket. Each of the long bars has a hook near each end and projecting backward. Preferably the length of this hook corresponds to the length of an adjacent sprocket tooth. The bars are linked together at each end by one or a series of linking members each consisting of short bars having hooks near both ends, these hooks preferably being disposed on opposite sides of a sprocket. The hooks on the long bars are hooked over the short bars. If a series of linking members are disposed between long bars, the two hooks on one linking member are hooked over the short bar of the adjacent linking member. The hooks of the rear linking member of a series are in turn hooked over an adjacent long bar.

The lengths of the hooks on the long bar and on the linking members preferably are such that the distance between bars, long or short, is the same and corresponds to the length of a sprocket tooth, i. e. to the distance between adjacent notches on the sprocket. Thus, as the conveyor advances around its sprockets, long and short bars fall between sprocket teeth. The best results are obtained if the hooks on long and short bars are of the same length, with each hook corresponding to one tooth thickness.

By way of example, if each tooth is two inches long at its base and the spacing between long bars is to be six inches, the hooks on long and short bars should be two inches long, two linking members being employed between long bars at each end. If the spacing is to be increased to eight inches, an additional linking member is inserted between long bars on each side. If the spacing is to be decreased to four inches a linking member is taken out of the chain on each side. And the spacing may be reduced to two inches by removing all linking members and hooking the long bars directly to each other, as in prior art structures.

In my preferred structure, the long bars extend a small distance outside the sprockets and the hooks are formed integrally on the two ends of the bars and bent backward and inwardly to a plane defining the outside of the sprocket teeth. The short bars of the linking members likewise should extend a like distance on both sides of the sprockets, with the hooks formed integrally on opposite ends of the short bars and in both cases bent back toward the sprockets so that the end of the outer hook lies in the same plane as the end of the hook on the long bar while the end of the inner hook lies near a plane defined by the inside of the sprocket teeth. Thus, the ends of the hooks on each link member are spaced apart by about the width of the teeth on the sprockets and serve as guides to keep the bar conveyor in alignment.

Preferably, the ends of the hooks in both long and short bars project inwardly of the conveyor loop. This gives a smoother outside structure and is also more satisfactory in that a conveyor thus constructed tends to ride better on its sprockets.

These and other aspects of my invention will be understood readily in the light of the following detailed description of a presently preferred embodiment. The description is illustrated by the accompanying drawing, in which.

In the apparatus illustrated by the drawings, a pair of sprockets 10 support the forward end of a bar conveyor 11, this bar conveyor being an endless loop (not shown) and with the balance of the loop supported by sprockets (likewise not shown) in a conventional manner.

The conveyor comprises a plurality of long bar members 12 which extend between the sprockets of the pair and ride on them in the notches between teeth as the sprockets are rotated. The long bars extend slightly beyond the sprockets at each side and are then bent inward and backward as viewed in Fig. 1 to form hooks 13 which trail the bars, the direction of rotation of the sprockets being clockwise as viewed in Fig. 3. The ends of the hooks on the long bars are parallel to the outside faces of the respective sprockets and near these faces.

Figure 1:
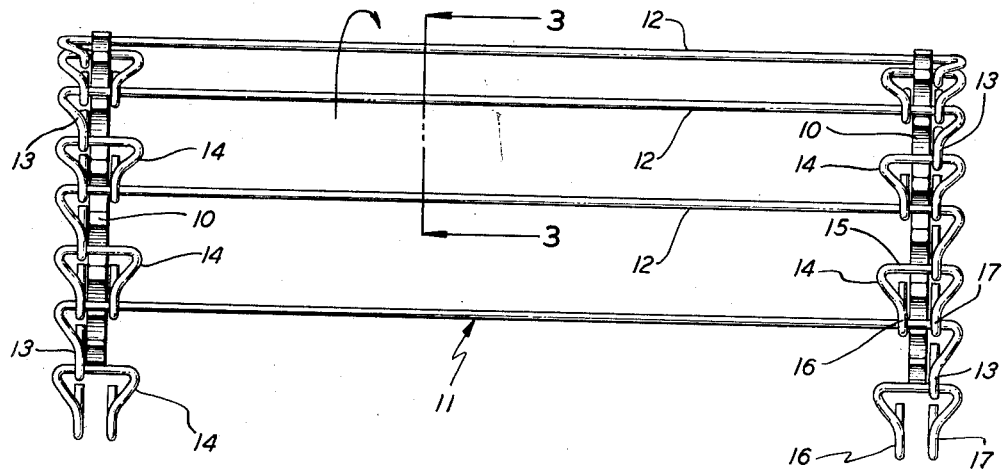
Fig. 1 is a fragmentary front elevation showing the bar members and the linking members assembled over a pair of sprockets of a bar conveyor.
Figure 3:
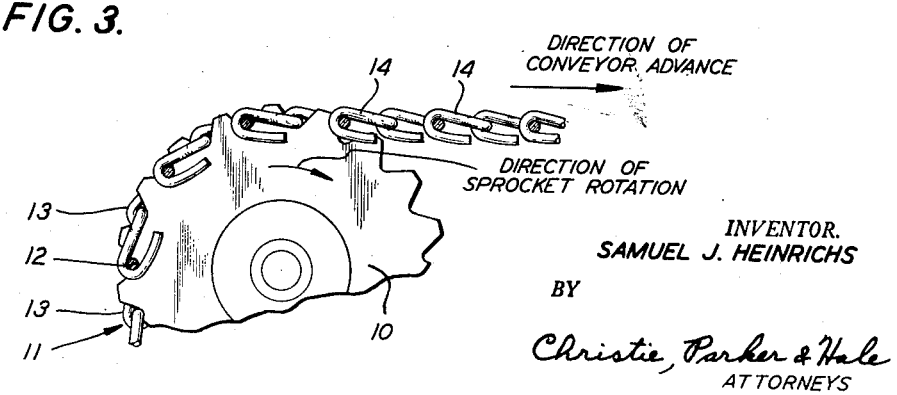
Fig. 3 is a fragmentary side elevation taken along the line 3—3 of Fig. 1, and showing the bar assembly of Fig. 1 passing over a sprocket.

In the bar conveyor of Figs. 1 and 3 the long bar members are fastened together by single sets of linking members 14. Each of these members comprises a short bar 15 that rides between teeth and contacts the sprocket near its middle and a pair of hooks 16, 17 which are similar to the hooks on the long bar members except that the inside hook is bent toward the sprocket and backward so that its end is near and substantially parallel to the inside face of the neighboring sprocket. In the illustrated embodiment, the short bar of the linking member is approximately four times as long as the sprocket it engages is wide.

As shown in Figs. 1 and 3, the hooks on the linking members with the short bars are hooked over the next long bar member while the hooks on the preceding long bar members are hooked over the short bar of the linking member that follows. Thus, in the assembly of Figs. 1 and 3 the long bars are spaced from each other by two tooth lengths.

In every instance the hooks on the long bars and the short bars correspond in length to the sprocket teeth.

Figure 2:
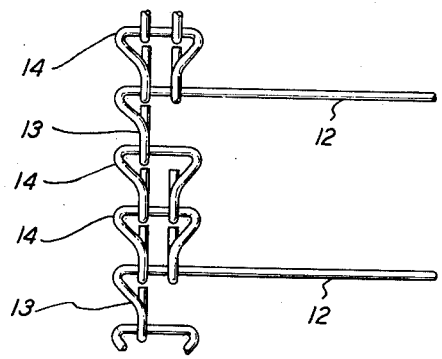
Fig. 2 is a fragmentary elevation of one end of the bar assembly of Fig. 1, but employing two linking members in series between bars.

Any number of linking members may be placed between long bar members. Thus, in the apparatus of Fig. 2 there are two linking members hooked in series between long bars so that the long bar members are spaced by three sprocket teeth. It will be plain that this spacing may be decreased or increased to any multiple.

In every instance it will be noted that the hooks on the long and short bars project inwardly of the conveyor loop, i. e. toward the axis of the sprocket. This gives a smoother upper conveyor surface and also tends to produce a linkage which rides more smoothly on the sprockets.

The apparatus of the invention has been described as operating in a direction of advance such that the free ends of the hooks project forward. This is satisfactory when the conveyor is used as a grizzly in ore screening or when the conveyor is operated on a potato digger in rocky soil. In some instances, however, it is desirable to reverse the direction of advance, for example, when the conveyor is used to separate fruit or vegetables from vines. In such case, forwardly projecting hook ends tend to snag the vines and carry them around the conveyor. This adds to the load and accomplishes nothing useful, but may be avoided by reversing the direction of advance, so that in effect, the free ends of the hooks project backward. In short, the loop conveyor of my invention may be operated clockwise or counter-clockwise, and the appended claims are intended to cover both situations.

I claim:

1. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with hooks near both ends with the hooks projecting backward, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having hooks near both ends with the hooks projecting backward, the hooks on each member being hooked over the bar of the member immediately behind it on the conveyor.

2. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with hooks near both ends with the hooks projecting backward, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having hooks near both ends with the hooks projecting backward, the hooks on each member being hooked over the bar of the member immediately behind it on the conveyor, and the length of all of the hooks being substantially the same as the length of a tooth on the sprocket at the base of said tooth.

3. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with hooks near both ends with the hooks projecting backward, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having hooks near both ends with the hooks projecting backward, the hooks on each member being hooked over the bar of the member immediately behind it on the conveyor and the ends of all of the hooks being on the inside of the conveyor loop.

4. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with hooks near both ends with the hooks projecting backward, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having hooks near both ends with the hooks projecting backward, the minimum distance between the hooks on each linking member being only slightly greater than the width of the teeth on the sprockets and the hooks on each member being hooked over the bar of the member immediately behind it on the conveyor.

5. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with hooks integral at both ends with the hooks projecting backward, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having integral hooks at both ends with the hooks projecting backward, the hooks on each member being hooked over the bar of the member immediately behind it on the conveyor.

6. In a loop conveyor having a set of concentric rotatable toothed sprockets spaced from each other along their axis of rotation and around which the conveyor advances, the combination which comprises a plurality of long bar members spaced from each other along the direction of advance and extending across the conveyor and adapted to rest near their ends between teeth on the sprockets as the conveyor advances, each long bar member being provided with integral hooks at its respective ends with the hooks projecting backward outside the sprockets, and at least one pair of linking members disposed between long bar members, one member of each pair being disposed respectively near the end of a long bar member and spaced from the other member of the pair, each linking member comprising a short bar positioned to rest near its midpoint between teeth on the respective sprockets as the conveyor advances and having hooks near both ends with the hooks projecting backward respectively on the inside and outside of the sprockets, the hooks on each member being hooked over the bar of the member immediately behind it on the conveyor.

No references cited.